(12) United States Patent
Minta

(10) Patent No.: US 9,890,864 B2
(45) Date of Patent: Feb. 13, 2018

(54) CHECK VALVES

(71) Applicant: Hamilton Sundstrand Corporation, Charlotte, NC (US)

(72) Inventor: Zbigniew Minta, Wroclaw (PL)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 14/814,776

(22) Filed: Jul. 31, 2015

(65) Prior Publication Data

US 2016/0040794 A1 Feb. 11, 2016

(30) Foreign Application Priority Data

Jul. 31, 2014 (EP) ..................................... 14461557

(51) Int. Cl.
*F16K 15/03* (2006.01)
*F16K 27/02* (2006.01)

(52) U.S. Cl.
CPC .......... *F16K 15/035* (2013.01); *F16K 15/038* (2013.01); *F16K 27/0227* (2013.01)

(58) Field of Classification Search
CPC ...... F16K 15/03; F16K 15/035; F16K 15/031; F16K 15/033; F16K 15/038; F16K 27/0227
USPC ................................................ 137/527, 512.1
See application file for complete search history.

(56) References Cited

U.S. PATENT DOCUMENTS

| | | | | |
|---|---|---|---|---|
| 1,306,391 A | * | 6/1919 | Romanoff ............. | F16K 15/148 137/512.15 |
| 3,023,771 A | * | 3/1962 | Hinds ................... | F16K 15/038 137/454.2 |
| 3,965,926 A | * | 6/1976 | Buckner ............... | F16K 15/038 137/512.1 |
| 5,246,032 A | * | 9/1993 | Muddiman ........... | F16K 15/038 137/512.1 |

(Continued)

FOREIGN PATENT DOCUMENTS

| | | |
|---|---|---|
| EP | 2034224 A2 | 3/2009 |
| GB | 948235 A | 1/1964 |

OTHER PUBLICATIONS

European Search Report, EP Application Serial No. 14461557.2, dated Jan. 5, 2015, 4 pages.

*Primary Examiner* — Craig Schneider
*Assistant Examiner* — P. Macade Nichols
(74) *Attorney, Agent, or Firm* — Kinney & Lange, P.A.

(57) ABSTRACT

A check valve comprises a valve body defining a valve opening and a pair of valve elements mounted so as to be movable from a closed position in which they close the valve opening to prevent fluid flow through the opening to an open position in which they permit fluid flow through the opening. The valve further comprises a one piece bridge element having first and second end portions mounted to the valve housing on opposite sides of the valve opening and an intermediate portion extending between the end portions. The intermediate portion acts as a stop for the valve elements in their open position. A shaft mounting the valve elements for pivotal movement between their open and closed positions, is supported in the end portions of the bridge element. Fasteners for attaching the bridge element to the valve housing overlap the ends of the valve shaft thereby retaining it in the bridge element.

20 Claims, 4 Drawing Sheets

(56) References Cited

U.S. PATENT DOCUMENTS

| | | | | |
|---|---|---|---|---|
| 6,796,327 B2* | 9/2004 | Bodnar | F16K 15/035 | 137/512.1 |
| 7,422,029 B2* | 9/2008 | Denike | B64D 13/02 | 137/512.1 |
| 7,568,498 B2* | 8/2009 | Denike | F16K 15/038 | 137/512.1 |
| 7,779,859 B2* | 8/2010 | Denike | B64D 13/02 | 137/512.1 |
| 7,954,509 B2* | 6/2011 | Dulay | F16K 15/038 | 137/15.18 |
| 8,726,930 B2* | 5/2014 | Barone | F16K 27/0227 | 137/512.1 |
| 8,800,596 B2* | 8/2014 | Kamp | F16K 27/0227 | 137/512.1 |
| 8,869,828 B2* | 10/2014 | Kamp | F16K 47/00 | 137/512.1 |
| 9,279,509 B2* | 3/2016 | Barone | F16K 15/038 | |
| 9,334,972 B2* | 5/2016 | Talawar | F16K 15/03 | |
| 9,383,023 B2* | 7/2016 | Kamp | F16K 15/038 | |
| 2008/0023080 A1* | 1/2008 | McGonigle | F16K 15/038 | 137/512.15 |
| 2008/0053536 A1* | 3/2008 | Denike | B64D 13/02 | 137/512.1 |
| 2008/0053537 A1* | 3/2008 | McGonigle | F16K 1/22 | 137/512.1 |
| 2008/0072973 A1* | 3/2008 | McGonigle | B64D 13/02 | 137/512.1 |
| 2008/0072974 A1* | 3/2008 | Denike | F16K 15/038 | 137/527 |
| 2008/0078458 A1* | 4/2008 | Denike | B64D 13/02 | 137/512.1 |
| 2008/0078459 A1* | 4/2008 | Warriner | B64D 13/02 | 137/512.1 |
| 2009/0032118 A1* | 2/2009 | Dulay | F16K 15/038 | 137/527 |
| 2009/0032119 A1* | 2/2009 | Dulay | F16K 15/038 | 137/527 |
| 2010/0282340 A1* | 11/2010 | Dehais | F16K 15/038 | 137/511 |
| 2013/0019966 A1 | 1/2013 | Hawa | | |
| 2013/0340862 A1 | 12/2013 | Kamp et al. | | |
| 2014/0041739 A1* | 2/2014 | Barone | F16K 15/038 | 137/516.25 |
| 2014/0202562 A1* | 7/2014 | Kamp | F16K 47/00 | 137/512.1 |
| 2015/0068612 A1* | 3/2015 | Barone | F16K 15/038 | 137/15.18 |
| 2015/0240960 A1* | 8/2015 | Kamp | F16K 15/038 | 137/856 |
| 2016/0010757 A1* | 1/2016 | Barone | F16K 15/038 | 137/12 |
| 2016/0018012 A1* | 1/2016 | Kamp | E05D 5/128 | 16/386 |
| 2016/0040792 A1* | 2/2016 | Kamp | F16K 15/03 | 137/15.19 |
| 2016/0040794 A1* | 2/2016 | Minta | F16K 15/035 | 137/527 |
| 2016/0040799 A1* | 2/2016 | Kamp | F16K 15/038 | 137/15.19 |
| 2016/0146361 A1* | 5/2016 | Solarz | F16K 15/038 | 137/527 |
| 2016/0146362 A1* | 5/2016 | Solarz | F16K 15/038 | 137/527 |

\* cited by examiner

CHECK VALVES

TECHNICAL FIELD

The present disclosure relates to check valves.

BACKGROUND

Check valves are valves that allow fluid flow in one direction therethrough and prevent flow in the opposite direction. They are widely used in a range of applications, for example in air conditioning systems, for example in an aircraft system.

Check valves commonly include one or more valve elements or flappers located at an opening in a valve body. The flappers are hingedly supported relative to the valve body such that in a closed position they lie across and close the opening, preventing fluid flow through the opening in one direction. However, under the pressure of a fluid (gas or liquid) on one side of the check valve, the flappers rotate from their closed positions so as to allow the fluid to flow through the valve in the opposite direction.

Typical check valves often have one or more physical stops, which limit the angle to which the flappers may open. When the flappers move from the closed to the open position, the flappers hit the stop or stops, thereby preventing the flappers from opening further. In a known arrangement, the stop is provided by a pin which is mounted to posts arranged on opposite sides of the valve housing and which extends across the opening at a distance therefrom. One such arrangement is shown in EP-A-2034224.

SUMMARY

From one aspect, the present disclosure provides a check valve comprising a valve body defining a valve opening and a pair of valve elements mounted so as to be movable from a closed position, in which they close the valve opening to prevent fluid flow through the opening, to an open position in which they permit fluid flow through the opening. A valve shaft mounts the valve elements for pivotal movement between their open and closed positions, The check valve further comprises a one piece bridge element having first and second end portions mounted to the valve housing on opposite sides of the valve opening and an intermediate portion extending across the valve opening. The intermediate portion acts a stop for the valve elements in their open position. The valve shaft is supported in the end portions of the bridge element.

The use of a one piece bridge element both to support the valve shaft and to provide a stop for the valve elements is beneficial in that it significantly simplifies the earlier arrangements in which multiple parts had to be assembled, which added to the valve's complexity and its weight, which is a major concern particularly in aircraft applications.

The bridge element may be made in any convenient manner. It may, for example be moulded, forged or cast. However, in certain embodiments it may be formed from a sheet material, for example sheet metal. This may allow the bridge element to be formed very simply, for example by cutting out an appropriately shaped element from a sheet of material and bending the element to the appropriate shape.

The particular material used for the bridge element will depend on the intended application of the valve, for example depending on the valve operating conditions, (pressure, temperature and fluid flow rate). It may be metallic, for example formed of a stainless steel material, or, if it is intended for higher temperature applications, from a nickel steel.

The bridge element may be either stiff or deformable, for example flexible, depending on, for example, the material used to make it, the thickness of the material and so on.

The bridge element may be formed with any convenient shape. It may for example be formed such that the intermediate portion extends straight between the end portions. However, in order to reduce the height of the valve at its peripheral regions (which may be desirable in certain installations where only limited space is available), the intermediate portion may extend upwardly from the end regions towards its center. Thus the intermediate portion could, for example, comprise a plurality, for example two, straight portions meeting at an apex portion. In a particular embodiment, however, the intermediate portion is arcuate in shape, for example having the shape of an arc of a circle, with a generally constant radius of curvature. Such arrangements also have the effect that it is possible to raise the point of impact of the valve elements on the intermediate portion, which will reduce the reaction forces acting on the valve shaft. An arcuate shape may, in certain embodiments, also permit the choice of an optimal impact point with a minimal increase in part weight. For example it may be possible to produce a check valve family with different impact heights, but similar overall geometry.

While the valve elements may engage with a relatively large section of the intermediate portion of the bridge element, it may be desirable to have the valve elements engage at a relatively small impact area. Accordingly, the intermediate portion may be provided with one or more lateral projections for engaging the valve elements. Typically these will be aligned on opposite sides of the intermediate portion to avoid bending moments being generated in the intermediate portion.

The intermediate portion of the bridge element may be narrower in width than the end portions of the bridge element. This may allow for a weight saving in the valve construction.

The valve shaft may be retained in the bridge element in a number of ways.

In one embodiment, the valve shaft may be retained by means of fasteners attaching the bridge element to the valve housing. This allows the fasteners to perform a dual function and means that the valve shaft may, for example, be of a constant diameter, without the need to provide any retention features on the shaft.

The fastener may therefore project upwardly to such an extent that it overlaps the adjacent end of the valve shaft, preventing it from moving out of the bridge element.

The end portions of the bridge element may each comprise a base limb for mounting to the valve housing and an upright limb for receiving the end of the valve shaft. The end portions may therefore be generally L shaped.

The base limb may therefore receive the fastener (such as a screw, bolt, nut or stud, for example) which attaches the bridge element to the valve housing.

In a particular embodiment, a bolt and nut arrangement is used, with a portion of the bolt extending above the nut to prevent valve shaft from moving out of the bridge element. Such an arrangement may be advantageous in that the shaft, as it abuts the bolt, may damage the bolt thread, thereby preventing the nut from unscrewing from the bolt and separating from the bolt in use. This may prevent the nut and bolt from separating and falling into the system, thereby potentially preventing damage to downstream system components.

In an alternative arrangement, the valve shaft may be provided with at least one reduced diameter or reduced cross sectional area end portion which is retained in a respective end portion of the bridge element. In one embodiment, reduced diameter or cross sectional area end portions are provided at both ends of the shaft and the bridge element made flexible or deformable to allow insertion of the end portions of the shaft in the bridge end portions.

BRIEF DESCRIPTION OF THE DRAWINGS

A non-limiting exemplary embodiment of a check valve in accordance with this disclosure will now be described with reference to the accompanying drawings in which.

DETAILED DESCRIPTION

Figure 1:
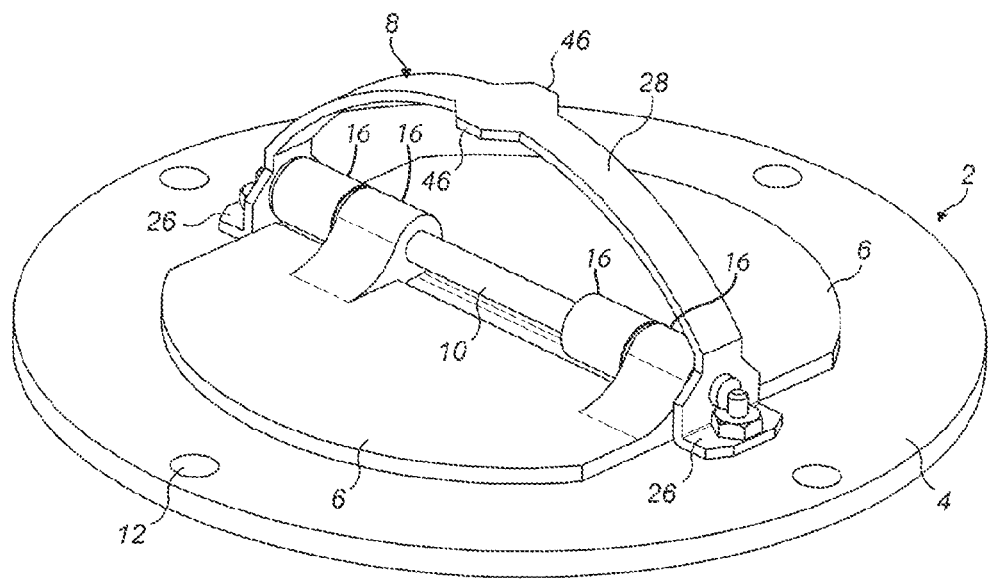
FIG. 1 shows a perspective view of a first embodiment of check valve in accordance with the disclosure.
Figure 2:
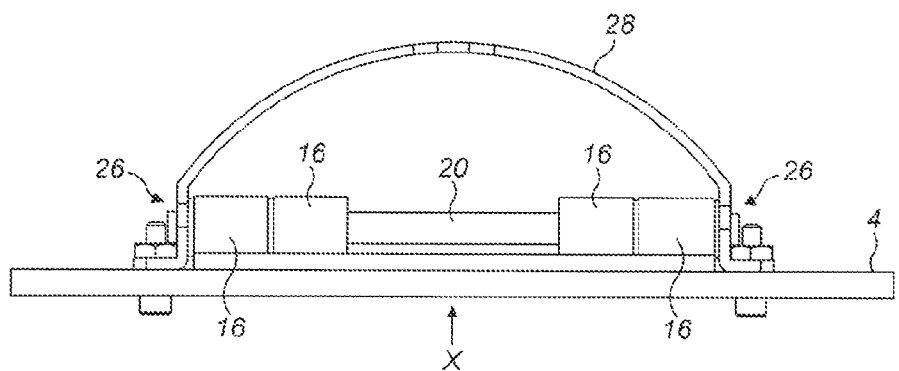
FIG. 2 shows a side elevation of the check valve of FIG. 1.
Figure 3:
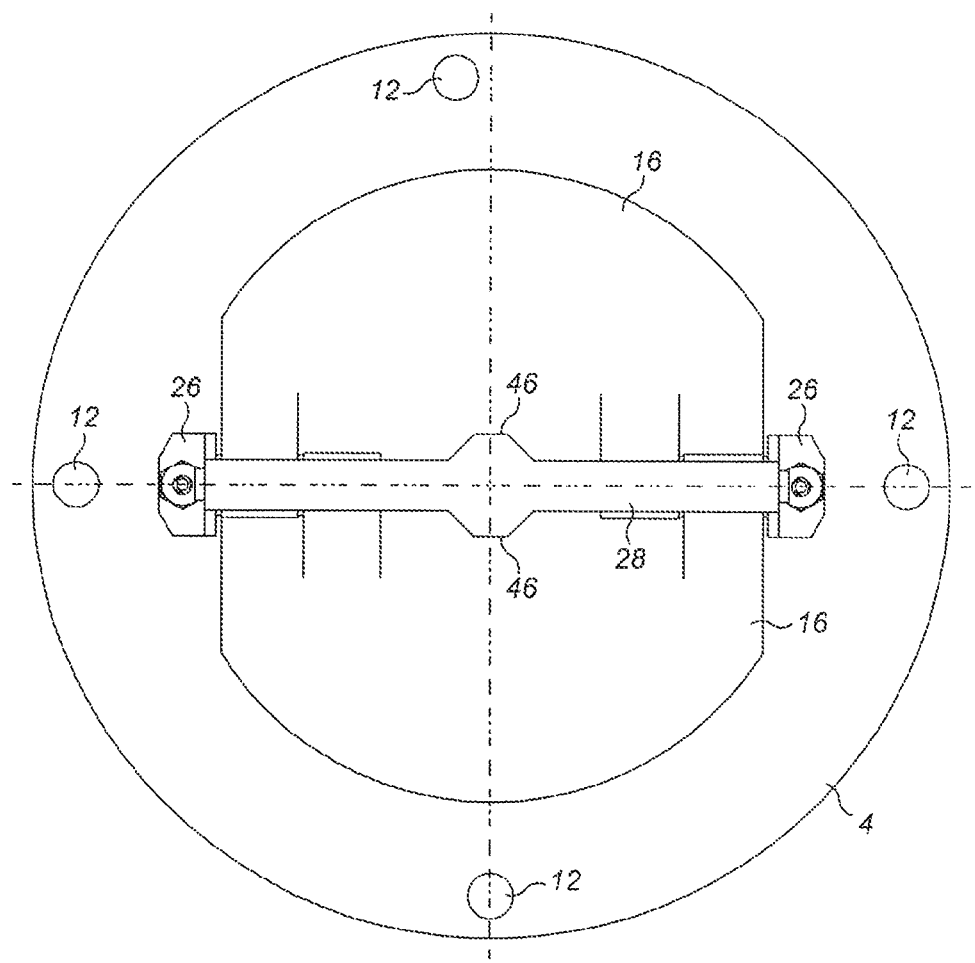
FIG. 3 shows a top view of the valve of FIG. 1.

With reference to FIGS. 1 to 6, a first embodiment of check valve 2 generally comprises a valve housing 4, a pair of valve elements or flappers 6, a bridge element 8 and a valve shaft 10.

The valve housing 4 in this embodiment is generally circular in shape and defines a generally circular valve opening through which a fluid may flow in one direction, namely from the bottom to the top in the sense of the Figures (although it will be appreciated that the valve housing may be installed in any orientation in use). The valve housing is provided with a plurality of, in this particular case four, apertures 12 around its periphery to allow it to be installed in a duct, pipe or any other fluid flow path.

Figure 4:
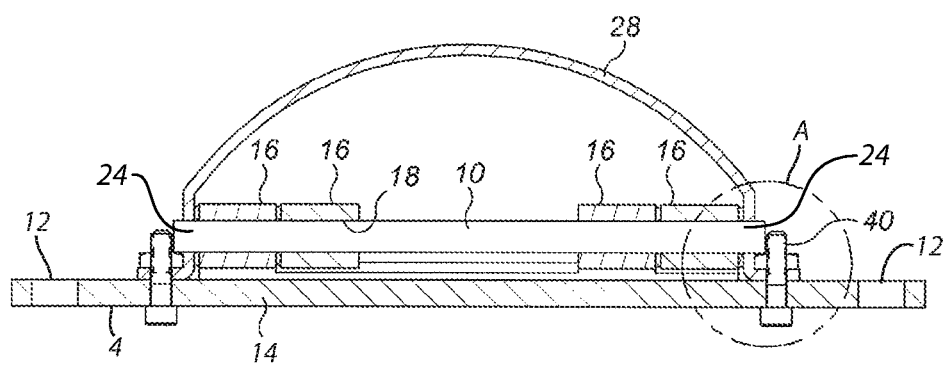
FIG. 4 shows a vertical sectional view through the valve of FIG. 1 taken along the line A-A shown in FIG. 3.
Figure 5:
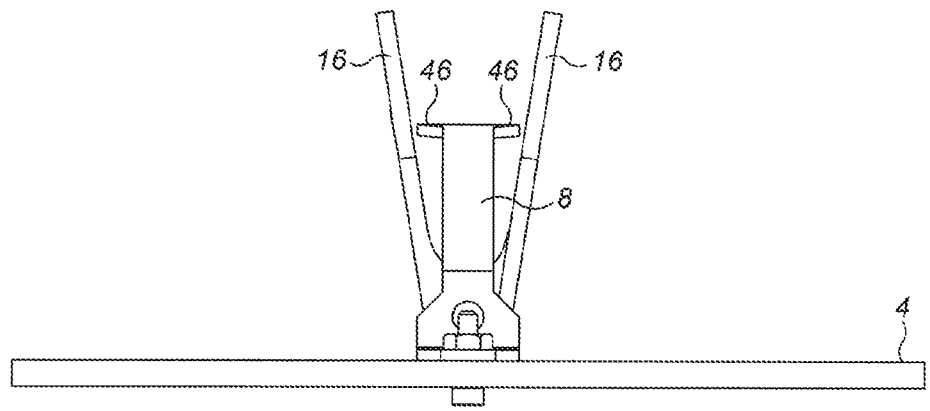
FIG. 5 shows a side elevation of the valve of FIG. 1 with the valve elements in an open position.

The valve opening is divided into two generally D-shaped openings by a web 14 of the housing (FIG. 4). Each D-shaped opening is provided with a seat which receives a respective valve element 6 when the valve element is in its closed position, as illustrated in FIGS. 1 to 4.

Each valve element 6 is also generally D-shaped and has a pair of lugs 16 at one edge thereof. Each lug 16 has a bore 18. The bores 18 receive the valve shaft 10 around which the valve elements 6 pivot. As can be seen from FIG. 1 for example, the lugs 16 of the respective valve elements 6 are arranged towards the ends of the shaft 10, leaving a central region 20 of the shaft exposed. However, this is not a limiting arrangement and other lug arrangements may be envisaged. For example each valve element might have three or more lugs 16, the lugs 16 of the respective valve elements alternating on the shaft 10.

The valve shaft 10 in this embodiment is a rod of constant diameter.

The valve shaft 10 is supported at its ends 24 in the bridge element 8. The bridge element 8 is a one piece element having opposed end portions 26, and an intermediate portion 28. The bridge element 8 is advantageously made from a sheet metal material so that it can be bent to the appropriate shape.

The end portions 26 of the bridge element are generally L-shaped in vertical section, having a base limb 32 and an upright limb 34. The ends 24 of the valve shaft 10 are received in aligned bores 36 formed in the respective upright limbs 34. The base limbs 32 are provided with respective bores 38 which receive a fastener 40 (in this example a bolt) for attaching the bridge element 8 to the valve housing 4. The fastener 40 also passes through a bore 42 provided in the valve housing 4. The fastener 40 is secured by a suitable element such as a nut 44.

Figure 6:
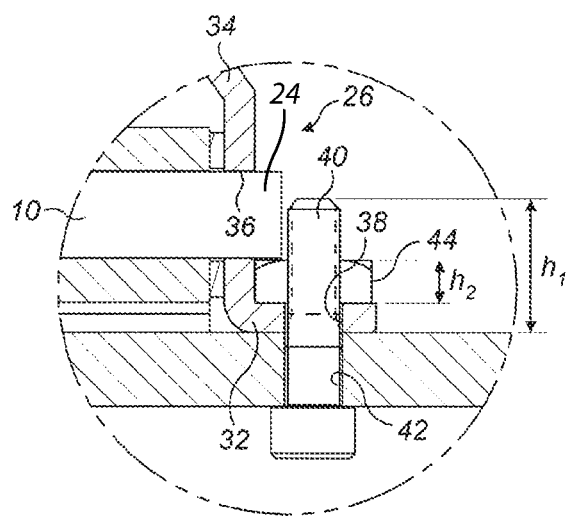
FIG. 6 shows an enlarged view of the region A shown in FIG. 4.

As can be seen for example from FIG. 6, the fastener 40 is of such a length that when received through the openings 42, 38 in the valve housing 4 and the base limb 32, it extends vertically to a height $h_1$ which is such that it overlaps the end 24 of the valve shaft 10. The valve shaft 10 will therefore be retained in the bridge element between the respective fasteners 40. This avoids the need for providing any special retention mechanism on the valve shaft 10, thereby simplifying its manufacture.

In this embodiment the nut 44 is chosen to be of such a height $h_2$ that it does not overlap the end 24 of the valve shaft 10. However, in other embodiments, the nut 44 may overlap the end of the valve shaft 10, thereby acting to retain the valve shaft 10. However, the former arrangement is more compact.

As can be seen from FIG. 1 for example, the intermediate portion 28 of the bridge element 8 is narrower than the end portions 26 of the bridge element 8. This represents a weight saving in the bridge element, while at the same time allowing for adequate support for the valve shaft 10.

The intermediate portion 28 of the bridge element 8 is, in this embodiment, arcuate in shape, having a generally constant radius of curvature. This is thought to provide good stress distribution in the bridge element 8 during impact of the valve elements 6.

As can be seen from FIG. 6, the bridge element 8 acts as a stop for the valve elements 6 when they are in their open position. To provide a relatively small contact area for each valve element 6, the bridge element 8 is provided with a pair of stop projections 46. These are aligned so as to avoid introducing bending moments on the central area of the bridge element 8. Of course, the bridge arm may be made without the projections 46, but these projections advantageously determine the area of impact and contact with the valve element 6 and allow the opening angle of the valve elements to be managed without significant weight increase.

It will be appreciated that the shape of the bridge element 8 means that it is possible to provide the stops 46 a significant distance above the valve housing 4. This means that the reaction forces acting on the valve shaft 10 during impact are reduced compared to a lower stop position. At the same time, the reduced height end portions 26 of the bridge element 8 allow the valve to be installed in relatively compact areas.

To assemble the check valve 2, the valve elements 6 may first be mounted on the valve shaft 10 which is then mounted in the bridge element 8. This sub assembly is then positioned on the valve housing 4 and the fasteners 40 inserted through the openings 40, 38 in the valve housing and the end portions 26 of the bridging element 8. The nuts 44 can be slid under the ends 24 of the valve shaft 10, and the vertical limb 34 of the end portion 26 prevents rotation of the nut as the fastener 40 is tightened. When fully inserted, the fasteners 40 will overlap the ends of the valve shaft thereby retaining the valve shaft 10.

In use, when the valve 2 is subjected to a flow of fluid in a flow direction X (FIG. 2), the valve elements 6 will be pivoted away from the valve opening, thereby allowing fluid flow through the valve 2 in that direction. However, fluid flow in the opposite, checked direction will cause the valve elements 6 to pivot closed, thereby preventing flow through the valve 2.

The various elements of the valve 2 may be made from any material appropriate to the intended use of the valve 2. For example, the various elements will typically be formed from a metallic material, for example steel. However, in other applications, other materials may be used.

Figure 7:
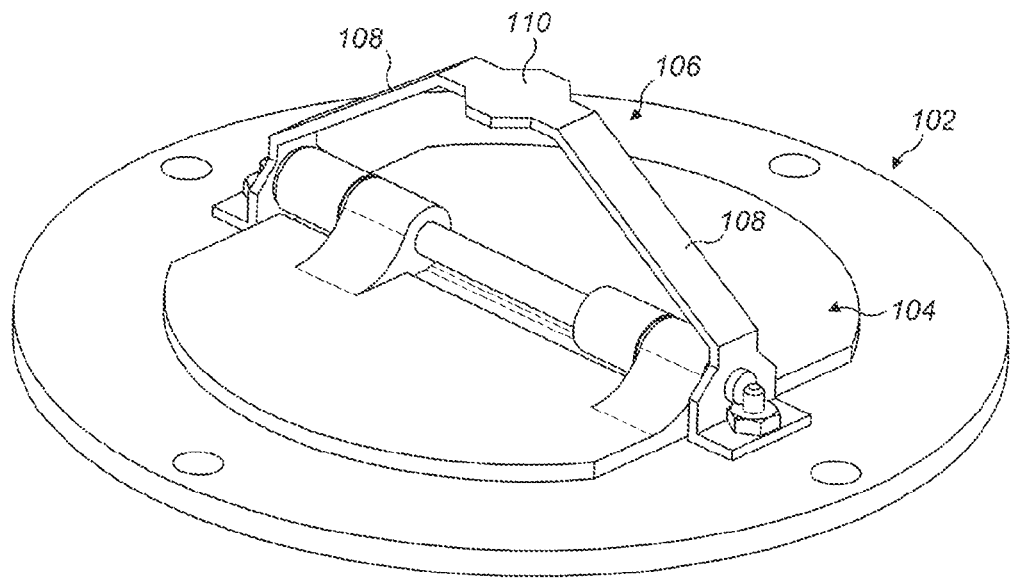
FIG. 7 shows a perspective view of a second embodiment of check valve in accordance with this disclosure.

Turning now to FIG. 7, a second check valve 102 in accordance with the invention is disclosed.

The general structure of the check valve 102 is the same as that of the check valve 2 of FIGS. 1 to 6, except for the shape of the bridge element 8. In this embodiment, the bridge element 104 has an intermediate portion 106 formed with two straight portions 108 joining at a generally flat apex portion 110. The remaining structure is the same and need not therefore be described further.

In a further variation of this construction, multiple straight portions may be provided on either side of the apex portion, so the bridge element 104 may have a generally "hip roof" shape.

Figure 8:
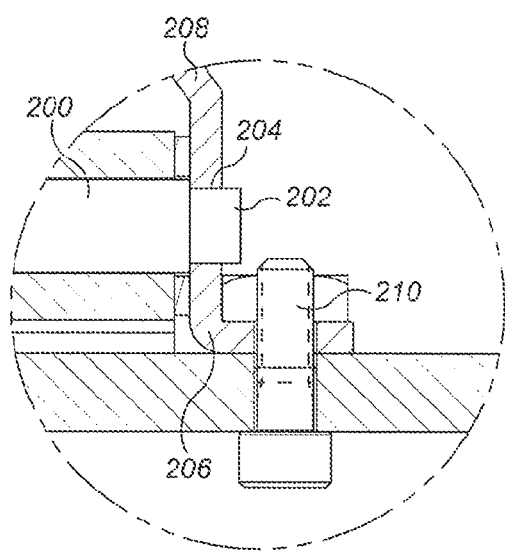
FIG. 8 shows a detail of a third embodiment of check valve in accordance with this disclosure.

Turning to FIG. 8, a detail of a third embodiment is shown.

In this embodiment, each end of the valve shaft 200 is formed with a reduced diameter end section 202. This reduced diameter section 202 is received in a corresponding opening 204 in the end portion 206 of the bridge element 208. The valve shaft 200 is therefore trapped between the end portions 206 of the bridge element 208. In this embodiment, the bridge element 208 should be deformable, advantageously elastically deformable, to the extent that the end portions 206 may be moved apart sufficiently to allow the end sections 202 of the valve shaft 200 to be inserted into the openings 204.

This embodiment therefore does not rely upon the fasteners 210 which attach the bridge element 208 to the valve housing retaining the valve shaft 200. This means that shorter fasteners 210, for example bolts as illustrated, may be used compared to the embodiments of FIGS. 1 to 7. It also means that smaller openings 204 may potentially be provided in the end portions 206 of the bridge element 208, which may increase the strength thereof.

It will be understood that the above description is of a non-limiting example and that various changes and modifications may be made thereto without departing from the scope of the disclosure.

For example, a further embodiment may be a hybrid of the embodiments of FIGS. 1 to 7 and FIG. 8. In such an embodiment, the valve shaft may be provided with a reduced cross sectional area at just one end, allowing it to be inserted through an opening in one end portion of the bridge element for engagement with and retention by an opening in the other end portion of the bridge element as shown in FIG. 8, with the other end of the valve shaft being retained by a fastener in the manner shown in FIG. 6.

The Summary section above indicates various alternative or additional features which may be employed. Also, if desired, a spring element may be provided which biases the valve elements 6 towards their closed position, meaning that the valve elements 6 will only move open in the event of a predetermined pressure differential across the valve 2. In such a case, the valve shaft may be provided with location features for the springs.

The invention claimed is:

1. A check valve comprising:
   a valve housing defining a valve opening;
   a pair of valve elements mounted so as to be movable from a closed position in which they close the valve opening to prevent fluid flow through the valve opening to an open position in which they permit fluid flow through the valve opening;
   a one piece bridge element having first and second generally L-shaped end portions mounted to the valve housing on opposite sides of the valve opening and an intermediate portion extending between the end portions, the intermediate portion acting as a stop for the valve elements in their open position; and
   a valve shaft mounting the valve elements for pivotal movement between their open and closed positions, said valve shaft being supported in the end portions of the bridge element;
   wherein the end portions of the bridge element each comprise an upright limb for receiving an end of the valve shaft and a base limb extending radially outward from the upright limb for mounting to the valve housing and wherein a fastener passes through a bore in the valve housing and a bore in the base limb such that the fastener extends vertically beyond the valve housing and the base limb, the fastener being in line with the valve shaft and attaching the bridge element to the valve housing.

2. The check valve as claimed in claim 1, wherein said bridge element is made from a sheet material.

3. The check valve as claimed in claim 1, wherein the bridge element is metallic.

4. The check valve as claimed in claim 1, wherein the intermediate portion extends upwardly away from the end regions.

5. The check valve as claimed in claim 1, wherein the intermediate portion is arcuate in shape, optionally having a generally constant radius of curvature.

6. The check valve as claimed in claim 4 wherein the intermediate region comprises a plurality of straight portions joined by an apex portion.

7. The check valve as claimed in claim 1 wherein the intermediate portion comprises one or more lateral projections for engaging the valve elements.

8. The check valve as claimed in claim 7, wherein the projections are aligned on opposite sides of the intermediate portion.

9. The check valve as claimed in claim 1, wherein the intermediate portion of the bridge element is narrower than the end portions of the bridge element.

10. The check valve as claimed in claim 1, wherein the valve shaft is retained on the bridge element by the fastener attaching the bridge element to the valve housing.

11. The check valve as claimed in claim 10 wherein the respective fastener extends to overlap the ends of the valve shaft.

12. The check valve as claimed in claim 1 wherein the valve shaft comprises at least one reduced cross section end portion which is received in an opening in at least one of the first and second end portions of the bridge element.

13. The check valve as claimed in claim 12 wherein the valve shaft comprises reduced cross sectional area end portions at both ends, the reduced cross sectional area end portions being received in respective openings in the end portions of the bridge element, the bridge element being flexible or deformable to permit insertion of the reduced cross sectional area end portions in the respective openings.

14. The check valve as claimed in claim 1, comprising no fasteners for retaining the valve shaft on the check valve, other than any fastener required for attaching the bridge element to the valve housing.

15. A check valve comprising:
- a valve housing defining a valve opening;
- a pair of valve elements mounted so as to be movable from a closed position in which they close the valve opening to prevent fluid flow through the opening to an open position in which they permit fluid flow through the opening;
- a one piece bridge element having first and second end portions mounted to the valve housing on opposite sides of the valve opening and an intermediate portion extending between the end portions, the intermediate portion acting as a stop for the valve elements in their open position; and
- a valve shaft mounting the valve elements for pivotal movement between their open and closed positions, said valve shaft being supported in the end portions of the bridge element;
- wherein the valve shaft comprises reduced cross sectional area end portions at both ends, the reduced cross sectional area end portions being received in respective openings in the end portions of the bridge element, the bridge element being flexible or deformable to permit insertion of the reduced cross sectional area end portions in the respective openings.

16. The check valve as claimed in claim 15, comprising no fasteners for retaining the valve shaft on the check valve, other than any fastener required for attaching the bridge element to the valve housing.

17. The check valve as claimed in claim 15, wherein the intermediate portion of the bridge element is narrower than the end portions of the bridge element.

18. A check valve comprising:
- a valve housing defining a valve opening;
- a pair of valve elements mounted so as to be movable from a closed position in which they close the valve opening to prevent fluid flow through the opening to an open position in which they permit fluid flow through the opening;
- a one piece bridge element having first and second end portions mounted to the valve housing on opposite sides of the valve opening and an intermediate portion extending between the end portions, the intermediate portion acting as a stop for the valve elements in their open position, wherein said bridge element is made from a sheet material; and
- a valve shaft mounting the valve elements for pivotal movement between their open and closed positions, said valve shaft being supported in the end portions of the bridge element.

19. The check valve as claimed in claim 18, wherein the valve shaft is retained on the bridge element by fasteners which fasten the bridge element to the valve housing.

20. The check valve as claimed in claim 19, wherein the respective fasteners extend to overlap ends of the valve shaft.

* * * * *